United States Patent
Lewtas et al.

(10) Patent No.: US 12,391,631 B2
(45) Date of Patent: Aug. 19, 2025

(54) RELATING TO ENERGETIC MATERIALS

(71) Applicant: LEWTAS SCIENCE & TECHNOLOGIES LTD, Oxford (GB)

(72) Inventors: Kenneth Lewtas, Wantage (GB); Daniel Jubb, Greater Manchester (GB); Mark Price, Didcot (GB)

(73) Assignee: LEWTAS SCIENCE & TECHNOLOGIES LTD, Oxford (GB)

( * ) Notice: Subject to any disclaimer, the term of this patent is extended or adjusted under 35 U.S.C. 154(b) by 1273 days.

(21) Appl. No.: 16/604,402

(22) PCT Filed: Apr. 10, 2018

(86) PCT No.: PCT/EP2018/059124
§ 371 (c)(1),
(2) Date: Oct. 10, 2019

(87) PCT Pub. No.: WO2018/189158
PCT Pub. Date: Oct. 18, 2018

(65) Prior Publication Data
US 2020/0148609 A1    May 14, 2020

(30) Foreign Application Priority Data
Apr. 10, 2017 (GB) ................................ 1705723

(51) Int. Cl.
C06B 45/10 (2006.01)
C06B 29/22 (2006.01)
C08L 49/00 (2006.01)
C08L 93/04 (2006.01)

(52) U.S. Cl.
CPC ............ *C06B 45/10* (2013.01); *C06B 29/22* (2013.01); *C08L 49/00* (2013.01); *C08L 93/04* (2013.01)

(58) Field of Classification Search
None
See application file for complete search history.

(56) References Cited

U.S. PATENT DOCUMENTS 6,740,180 B1 * 5/2004 Cesaroni ................. C06B 45/10
                                                                    149/19.91
2015/0232714 A1    8/2015 Nomura et al.

FOREIGN PATENT DOCUMENTS

| GB | 2166128 A | 4/1986 |
|---|---|---|
| GB | 2365420 A | 2/2002 |
| GB | 2555764 A | 5/2018 |
| JP | S57-196788 A | 12/1982 |
| JP | S57-196789 A | 12/1982 |
| JP | H02138379 A | 5/1990 |
| WO | 2017/064102 A1 | 4/2017 |

OTHER PUBLICATIONS

International Search Report and Written Opinion from the European Patent Office for Application No. PCT/EP2018/059124 mailed Sep. 25, 2018.
UK Search Report for Application No. GB1705723.3 mailed Nov. 29, 2018.
Canadian Office Action, CA Application No. 3,063,791 dated May 6, 2024.
European Office Action, EP Application No. 18 718 125.0 dated Oct. 17, 2023.
European Office Action, EP Application No. 18 718 125.0 dated Jul. 23, 2021.
Translation of Japanese the Examiner's Comments, JP Application No. 2020/504442 dated Apr. 22, 2022.
Great Brittain Examination Report, GB Application No. 1705723.3 dated Oct. 11, 2022.
Great Brittain Examination Report, GB Application No. 1705723.3 dated Oct. 1, 2021.
Translation of Korean Office Action, KR Application No. 10-2019-7033309 dated May 23, 2023.
Translation of Korean Office Action, KR Application No. 10-2019-7033309 dated May 29, 2024.
Translation of Korean Final Office Action, KR Application No. 10-2019-7033309 dated Dec. 24, 2024.
Indian First Examination Report, IN Application No. 201917045595 dated Aug. 6, 2021.
Indian Examination Report, IN Application No. 202218032330 dated Dec. 26, 2022.

* cited by examiner

*Primary Examiner* — Aileen B Felton
(74) *Attorney, Agent, or Firm* — The Dobrusin Law Firm, P.C.

(57) ABSTRACT

A tackifier is used resin in an energic material formulation comprising active materials and a polymeric binder to reduce or eliminate the use of a plasticiser in the formulation wherein the tackifier resin is compatible with the polymeric material.

5 Claims, No Drawings

RELATING TO ENERGETIC MATERIALS

BACKGROUND

Conventional energetic material formulations contain active materials (a fuel and an oxidiser) and a binder. The binder typically comprising a mixture of a polymer, a plasticiser, a cross linking (or curing) agent and optionally a bonding agent (sometimes called a coupling agent). Other optional ingredients such as a burning rate modifier may also be included. These materials are included for a variety of reasons ranging from the use of the plasticiser to enable ready processing of the formulation in mixers and the use of the bonding agent to secure the oxidiser within the formulation.

In many uses of energetic materials particularly as propellants such as in rocketry the formulation is contained within the metal casing of the rocket motor until firing of the rocket. In order to protect the metal casing from the energy produced (pressure and heat) during the firing of the rocket a liner such as a polymeric phenolic resin or rubber layer is provided between the energetic material and the metal casing. Rubber such as an ethylene/propylene/diene rubber is preferred as it can compensate for any shrinkage of the energetic material during curing. The fueled rocket may then be stored for some time in this condition prior to firing. However, the plasticiser present in the energetic material tends to migrate to the surface of the energetic material and into the liner when present or to be adjacent to the inner surface of the metal casing. In each instance this reduces the homogeneity of the formulation and impairs the adhesion of the formulation to the liner or the casing. It would therefore be desirable to reduce or eliminate the use of plasticiser whilst at the same time retaining the ability to process (mix) the formulation.

The bonding agent can react with the oxidiser and the bonding agents typically contain nitrogen and the reaction with the oxidiser can result in the undesirable formation of ammonia. Accordingly it would also be desirable to reduce or eliminate the use of a bonding agent whilst retaining the homogeneity and improving the adhesion of the formulation of the energetic material.

Many energetic material formulations employ polybutadiene based materials as a polymeric binder. Whilst these materials are effective binders they are typically of a relatively low density (of the order of 0.90). It would be useful to be able to replace at least some of the binder by a material of greater density as this would enable more energy to be derived per unit of the energetic material formulation.

A formulation for an energetic material is set out in Example XI of U.S. Pat. No. 6,740,180 which contains a three component binder system of 8.90 parts of Elvax 210/3% silicant R as the polymeric component; 5.34 parts of Reglarez 1094 hydrogenated hydrocarbon resin and 3.56 parts of a polyethylene oxide wax as a plasticiser. Accordingly the plasticiser is used in an amount of about 20% of the polymeric binder. Elvax 210 contains 28 wt % vinyl acetate and Reglarez 1094 is said on its product data sheet to have compatibility and solubility with EVA copolymers containing less than 20% vinyl acetate. Accordingly this indicates that the Reglarez 1094 used in the formulation of Example XI will not be compatible with the Elvax 210 used in the formulation.

In our pending PCT application PCT/EP2016/074423 we describe the use of compatible tackifier resins in energetic materials formulations. We have now found that providing a tackifier is used that is compatible with the polymeric binder used in the formulation of the energetic material the need for plasticiser in the formulation can be reduced or eliminated. Additionally we have found that by using such a tackifier in the formulation it is possible to reduce or eliminate the amount of bonding agent required in the formulation. The density of the Elvax 210 used in U.S. Pat. No. 6,740,180 is said to be 0.951 g/cm2 whereas the density of the compatible tackifiers with which this invention is concerned are greater or equal to 1.0 and the use of the tackifier resin to replace some of the less dense polymeric binder enables the production of a more powerful energetic material formulation.

Of those several benefits the ability to reduce or eliminate the amount of plasticiser in the formulation is considered to be the most beneficial.

SUMMARY

Accordingly the present invention provides the use of a tackifier resin in an energic material formulation comprising an active material and a polymeric binder to reduce or eliminate the use of a plasticiser in the formulation wherein the tackifier resin is compatible with the polymeric material.

The invention further provides a binder system for an energetic material formulation comprising
  i) a polymeric binder;
  ii) a tackifier resin that is compatible with the polymeric binder; and
  iii) from 0 to 50 wt % based on the weight of the polymeric binder of a plasticiser.

The invention further provides a binder system for an energetic material formulation comprising
  i) a polymeric binder;
  ii) a tackifier resin that is compatible with the polymeric binder;
  iii) from 0 to 50 wt % based on the weight of the polymeric binder of a plasticiser;
  iv) an active material;
  v) from 0 to 0.5 wt % of a bonding agent based on the weight of active material.

Additionally the invention provides an energetic material formulation comprising
  i) from 65% to 98% of an active material;
  ii) from 2% to 20% of a polymeric binder;
  iii) from 0 to 50 wt % based on the weight of the polymeric binder of a plasticiser;
  iv) from 0.1% to 70% based on the weight of the polymeric binder of a tackifier resin compatible with the polymeric binder;
  v) from 0% to 0.5% based on the weight of the active ingredient of a bonding agent.

DETAILED DESCRIPTION

Throughout this application all percentages are percentages by weight.

We prefer that in all aspects of this invention the amount of plasticiser is below 20% based on the weight of the polymeric binder preferably 0 to 18%.

The term tackifier or tackifying resin has several meanings. For example, polyisobutylene is sometimes called a tackifying material and is a sticky material with a $T_g$ below −80° C. typically between −100° C. and −90° C. and is used in GB 2365420 to ensure adhesion between the materials of the formulation. Polyisobutylene is incompatible with polyethylene.

In this invention the term tackifier resin is used to describe a material that is compatible with the polymeric binder that is used in the formulation. Unlike the Elvax 210/Reglarez 1094 mixture of U.S. Pat. No. 6,740,180 the tackifier resin should be compatible with the polymeric binder which means that the integrity of the blend of the polymeric binder and the tackifier resin in the binder mixture should be maintained over a temperature range of −60° C. to 150° C. or higher perhaps up to 200° C. The compatibility is judged to be sufficient when there is no phase separation within the processing temperature range (typically between 10° C. and 150° C.). Some haze can be tolerated but no gross phase separation should be seen. The tackifying resin used in this invention preferably has a $T_g$ in the range −70° C. to +200° C., preferably −50° C. to +150° C., most preferably −20° C. to +130° C.

The formulations typically can also contain cross-linking agents (curing agents) for the polymeric binder matrix.

The tackifying resins used in the present invention are largely amorphous materials of low molecular weight (e.g. 400-2000) with relatively high (but variable) glass transition temperatures ($T_g$) above −70° C. and preferably in the range −70° C. to +200° C. as set out above. Unlike the polyisobutylene used in GB 2365420 they are known to be used as additives in polymers where they are compatible with the polymer and decrease the degree of chain-entanglement of the polymers they are added to and thus affect the formulation rheology (e.g. lowering of plateau modulus) and final properties (adhesive tack, adhesive strength and elongation).

Tackifier resins that can be used in this invention are well known and may be derived from natural materials such as Tall Oil Rosin Esters or they may be synthetic resins such as the hydrocarbon resins derived from hydrocarbon streams obtained in the cracking of petroleum products. These synthetic resins may be aliphatic, aromatic or aliphatic/aromatic and, in the case of synthetic resins, are typically derived from C5 streams, C9 streams or mixtures thereof from refinery/chemical plant steam crackers. Pure monomers can also be used in these resins, e.g. various terpenes, styrene, alpha-methyl styrene, indene, etc.

Examples of suitable resins for use in this invention are rosin esters derived from rosin which may be converted to rosin ester. Three types of rosin are used for resin manufacture, gum rosin, wood rosin and tall oil rosin, and they are all generated from the pine tree.

Tall oil rosin is obtained by distillation of crude tall oil, a by-product of the kraft sulphate pulping process used in paper making. Crude tall oil typically contains 70-90% acidic material, which is composed essentially of fatty acid and tall oil rosin. Tall oil rosin (TOR) has a tendency to crystallize and usually contains 200-600 ppm sulfur. Highly distilled TOR can produce esters which have been found to be useful in this invention.

Rosin resins are typically a blend of the following different molecules.

We prefer to use from 5 to 60 wt % of the tackifier based on the weight of the polymeric binder more preferably from 10 to 55 wt %.

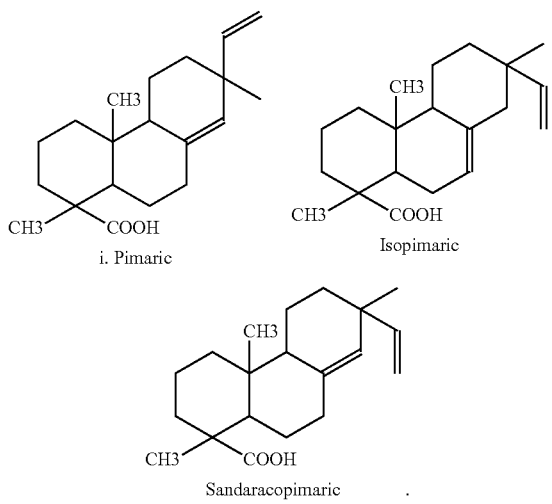

Rosin molecules can have poor stability caused by unsaturation and stability can be improved by various methods such as disproportionation and hydrogenation.

Rearrangement of the double bonds by disproportionation leads to improved stability as shown below.

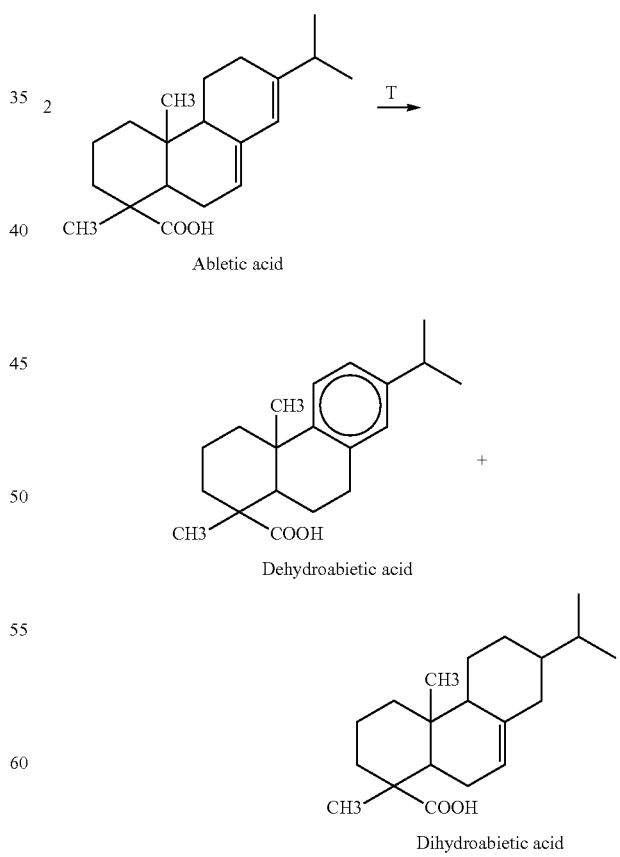

Another method to improve stability is to hydrogenate the rosin molecules as follows.

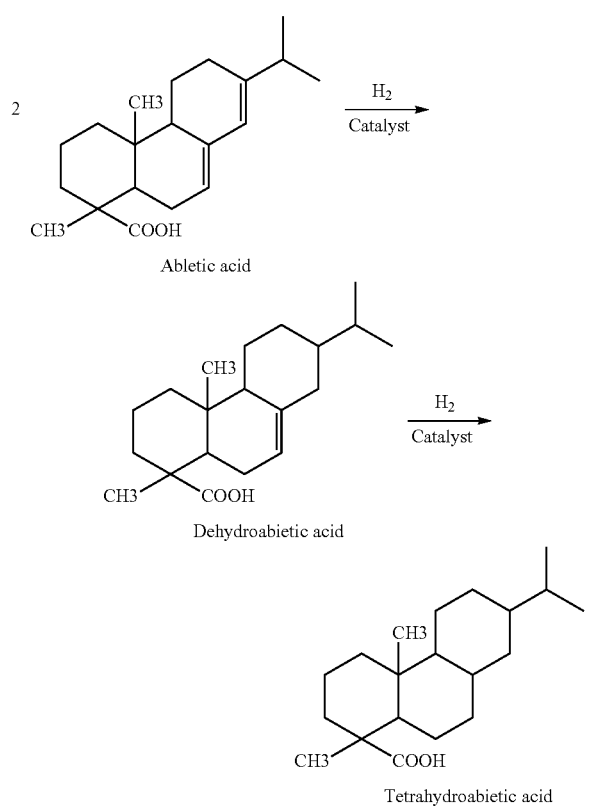

Abietic acid

Dehydroabietic acid

Tetrahydroabietic acid

The carboxylic acid can be converted to an ester using various alcohols. The number of alcohol groups and molecular weight of the alcohol determines the softening point of the subsequent ester. Glycerol and pentaerythritol are the most commonly used alcohols. Methanol and tri-ethyleneglycol are used to produce lower softening point esters.

The esterification reaction is an equilibrium reaction, which is driven to near completion. However, there will always be some unreacted acidic and hydroxyl groups. A typical acid number for a pure rosin acid is around 170. A glycerol ester typically has an acid value below 20. The type of alcohol chosen is key to the molecular weight of the rosin ester and its softening point. Multi-alcohol compounds may be partially esterified, e.g. a mixture of mono-, di-, tri-, tetra-, etc. esters. A typical softening point for glycerol esters is 85° C., and 105° C. for pentaerythritol esters. The difference in softening point affects their compatibility and hence the softening point will be chosen according to the nature of the polymer binder in the energetic material.

Rosin resins have a wide span of compatibility with almost all polymers and they have been found to be particularly useful in the present invention.

Terpene resins are typically based on three natural feedstreams and are formed by a cationic polymerization reaction using a Lewis acid catalyst.

Terepenes such as alpha-pinene and beta-pinene are derived primarily from two processes: stump extraction leading to the isolation of steam distilled wood turpentine and the kraft sulfate pulping process leading to the isolation of sulfate turpentine. The individual terpene compounds are isolated by distillation from these two streams.

d-Limonene is obtained from citrus sources and a similar compound, dipentene, is obtained by distillation from petroleum sources.

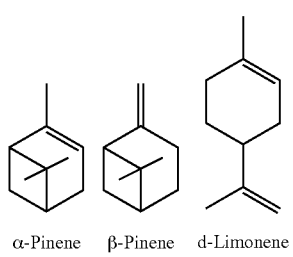

α-Pinene   β-Pinene   d-Limonene

There are other resins based on these terpene feedstocks:

Styrenated terpenes—mixed aliphatic/aromatic resins

Terpene phenolics—polar resins with excellent adhesion and broad compatibility with polar polymers.

Hydrogenated terpenes—improved colour by hydrogenation

These resins are also useful in the present invention.

Mixtures of these materials may be used in the synthesis of the final tackifying resin, e.g. terpenes can be added to hydrocarbon resins.

Hydrocarbon resins may also be used and there are five major types of hydrocarbon resins:

| | |
|---|---|
| C5 | aliphatic resins |
| C5/C9 | aliphatic/aromatic resins |
| C9 | aromatic resins |
| DCPD | cycloaliphatic resins (dicyclopentadiene precursor) |
| DCPD/C9 | cycloaliphatic/aromatic resins |

The feedstocks to produce C5 and C9 hydrocarbon resins are usually fractions from a naphtha cracker or a steam cracker. The feed streams to produce hydrocarbon resins can be divided into three groups: C5 (e.g. piperylene, isoprene, etc.) streams, C5 DCPD (di-cyclopentadiene) streams and C9 (e.g. indene, styrenes, etc.) streams.

C5 streams contain one or more of the various monomers, illustrated below.

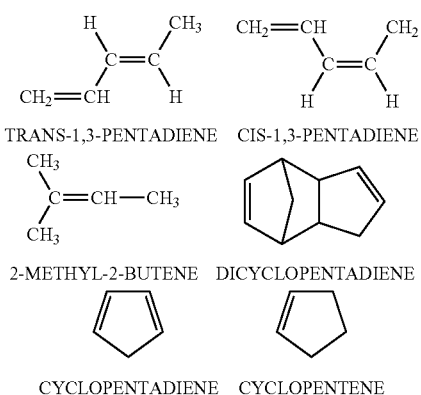

TRANS-1,3-PENTADIENE   CIS-1,3-PENTADIENE

2-METHYL-2-BUTENE   DICYCLOPENTADIENE

CYCLOPENTADIENE   CYCLOPENTENE

The liquid C5 feedstock can be polymerized to a solid resin using a Lewis acid catalyst (e.g. AlCl3 or BF3) and carefully selecting temperature and pressure to obtain the desired softening point and molecular weight.

C5 resins are, in essence, aliphatic materials. They are available in a wide range of softening points and molecular weights.

C9 Aromatic Hydrocarbon Resins

C9 resin oil contains various monomers as shown below.

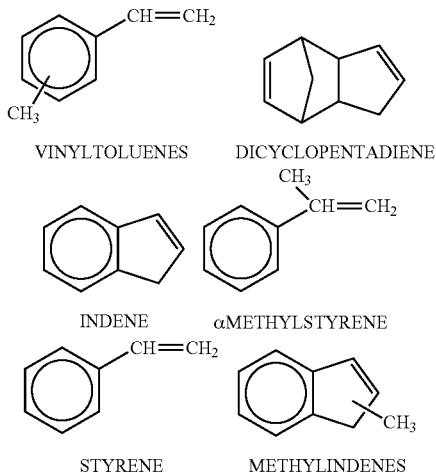

VINYLTOLUENES  DICYCLOPENTADIENE

INDENE  αMETHYLSTYRENE

STYRENE  METHYLINDENES

C9 resins are aromatic molecules. They are also available in a wide variety of softening points and molecular weights.

C5 and C9 resins can be modified by mixing the two feed streams together in certain ratios. This ratio determines the aliphatic/aromatic balance of the resin, which is essential to formulators.

The aliphatic C5 feed can be replaced with a terpene feedstock and modified with styrene to form "styrenated terpenes" which have excellent colour and stability.

C5 and C5/C9 resins can be optionally partially or fully hydrogenated.

Dicyclopentadiene (DCPD) feedstock contains various structures such as those shown below, but is primarily made up of dicyclopentadiene. The feed stock also contains codimers with dienes such as isoprene, butadiene and methylcyclopentadiene. At elevated temperature (170-190° C.), dicyclopentadiene will crack into cyclopentadiene.

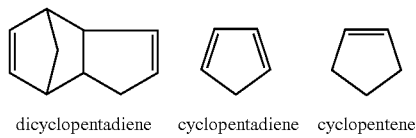

dicyclopentadiene   cyclopentadiene   cyclopentene

The thermal polymerization is thought to involve the Diels-Alder addition of cyclopentadiene to the norbornene olefin followed by continued additions of this type by additional cyclopentadiene to propagate the growing chain as shown below.

Cycloaddition of CPD to the norbornene ring of DCPD.

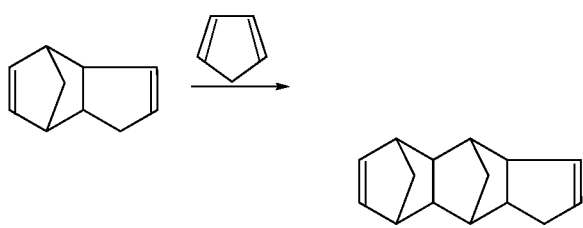

Cycloaddition of CPD to the Growing Chain

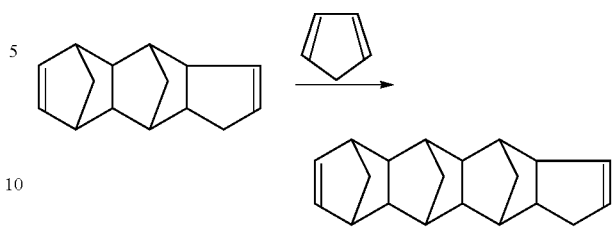

Further autocatalytic free-radical linking of these structures can extend the molecular weights. Aromatics, e.g. C9 stream, can be added to this material.

Dicyclopentadiene is polymerized either thermally or with a catalyst to form relatively dark and unstable resins with a characteristic odour. They are more commonly used as a base resin for subsequent hydrogenation to form water white resins with excellent stability and low odour. The hydrocarbon resins described above can be hydrogenated to produce another class of hydrocarbon resins. Hydrogenation is primarily used to improve colour and stability of the resin by removing vulnerable double bonds.

Partial and selective hydrogenation are methods used to produce resins with broad compatibility and good stability.

The most common base resins used for hydrogenation are as follows:

C9 and C9/C5 resins.

DCPD and modified DCPD resins

C9 resins contain double bonds and have predominantly aromatic ring structures with an overall aromaticity, which are relatively unstable. Hydrogenation is a useful way to stabilize these resins. Resins can be hydrogenated in solution with very specific operating parameters: temperature, pressure, hydrogen concentration and catalyst level. Changing any one of these operating parameters will bring a change in the degree of hydrogenation of the final resin. During hydrogenation, the aromatic ring structures gradually lose their aromatic nature and become cyclo-aliphatic.

When the hydrogenation process is allowed to go to completion, the result is a fully hydrogenated hydrocarbon resin with full aliphatic character. The process can also be adjusted so that the resins are partially hydrogenated and still have some aromatic rings. The ability to be hydrogenated to varying degrees, resulting in various aliphatic/aromatic balances, gives these resins their unique properties. The resin can also control the burn rate of the energetic material particular the hydrocarbon resins.

Any of these tackifier resins may be used in the present invention. The choice of resin will depend upon the nature of the energetic material and also the nature of the polymer binder used in the formulation. Resins containing polar groups are preferred when there is polarity in the binder polymer.

The energetic filler and the relative proportions of the components of the energetic material will depend upon the type of application for which the material is to be used.

The present invention may be used in for example a plastic bonded explosive in which the binder forms between 0.5 and 30% by weight and the energetic filler forms between 99.5 and 70% by weight. We prefer that ratio of polymeric binder matrix and tackifying resin in the energetic material be from 99:1 to 10:90, preferably from 95:5 to 20:80, more preferably from 90:10 to 40:60.

Examples of suitable energetic binder materials are nitrocellulose, polyvinyl nitrate, nitroethylene, nitroallyl acetate, nitroethyl acrylate, nitroethyl methacrylate, trinitroethyl acrylate, dinitropropyl acrylate, C-nitropolystyrene and its derivatives, polyurethanes with allphatic C- and N-nitro groups, polyesters made from dinitrocarboxylic acids and dinitrotrodiols and nitrated polybutadienes.

Extenders may be used as part of the binder formulation to improve the processibility and flexibility of the product. For example, heavy grade liquid paraffin (up to 3% by weight of the binder formulation) may be employed in the binder.

The mixture of polymer binder matrix and tackifier resin is used at a ratio of 1:99 to 90:10 in relation to the total of the other components in the formulation. Preferably from 5:95 to 40:60 more preferably from 10:90 to 30:70.

Examples of active components (sometimes known as energetic fillers) to which this invention applies include organic secondary explosives. Alicyclic nitranes such as RDX (1,3,5-cyclotrimethylene-2,4,6,-trinitramine) and HMX (1,3,5,7-cyclotetramethylene-2,4,6,8-tetrar,itramine) and TATND (tetranitro-tetraminodecalin) and mixtures thereof. The following active components may also be used as the main or as a subsidiary energetic component in plastic bonded explosives-nitroguanidine, aromatic nitramines such as tetryl, ethylene dinitramine, nitrate esters such as nitroglycerine, butanetriol trinitrate and PETN (pentaerythritol tetranitrate). Other nitroaromatic compounds such as trinitrotoluene (TNT) triaminobenzene (TATB) triaminotrinitro benzene (TATNB) and hexanitrostilbene may also be used.

Alternatively active components such as inorganic fillers such as ammonium nitrate and alkaline earth metal salts provide suitable high explosive materials. Metallic fuels such as powdered aluminium, magnesium or zirconium may be used to fuel the exothermic reaction of the oxidation of the energetic material. The metallic fuel may comprise up to 50% by weight of the energetic filler.

The energetic material may alternatively comprise a gun propellant. In such a material the content of the active component is generally in the range 70 to 90% by weight of the binder/filler mixture and may be selected for example from nitroglycerine, RDX and HMX or a combination thereof, optionally with other highly active components such as those listed above. The binder of such a material may comprise in addition to the blend specified above a cellulosic material e.g. nitrocellulose e.g. forming from 5 to 95%, e.g. 30 to 70% by weight of the binder.

The energetic material may alternatively comprise a gas generator material as the active component for example, for power cartridges for actuators: for base burning, reduced base drag, extended range projectiles; and for control gas jets for missile and projectile guidance systems and the like. Such material is similar in nature to a propellant, but in general contains a lower content of active component, e.g. 45% to 65% by weight optionally together with a surface burning rate inhibitor, e.g. ethyl cellulose.

As an example of a suitable rocket propellant embodying the invention the propellant composition may include as active component ammonium perchlorate (20 to 90% by weight) together with aluminium as fuel (5 to 50% by weight of its mixture with the active component), the binder forming for example 2 to 30%, typically 2 to 20% by weight of the composition together with the tackifier resin.

The energetic material may also comprise a polymer bonded pyrotechnic material, e.g. containing an inorganic nitrate or perchlorate of ammonium, barium or strontium (forming 20 to 80% by weight of the energetic filler), a metallic fuel such as magnesium or zirconium (forming 5 to 60% by weight of the filler), the binder comprising 5 to 30% by weight of the overall composition.

Although the use of non-viscous plasticisers may be avoided by use of the polymer bonded energetic materials because the polymers can have a plasticising effect upon the polymer, non-viscous plasticisers may optionally be incorporated in low concentrations in the compositions according to the present invention. Additionally the use of the tackifier resin may avoid the need for plasticisers in the formulation.

Where plasticisers are used, common plasticisers which are dialkyl esters of phthalic, adipic and sebacic acids may be used as the optional plasticiser, e.g. the plasticiser may comprise dibutyl phthalate, disobutyl phthalate, dimethyl glycol phthalate, dioctyl adipate or dioctyl sebacate. We have found that the use of the tackifier that is compatible with the binder can enable the amount of these plasticisers that is used to be reduced to less than 20% by weight of the binder.

In addition, or alternatively, energetic plasticisers such as BDNPAIF (bis-2-dinitropropylacetral/formal), bis-(2-fluoro-2,2-dinitroethyl) formal, diethylene glycol dinitrate, glycerol trinitrate, glycol trinitrate, triethylene glycerol dinitrate, trimethylolethane trinitrate butanetriol trinitrate, or 1,2,4-butanetriol trinitrate, may be employed in concentration less than 10% by weight of binder in the materials according to the present invention.

Examples of suitable additional inert or non-energetic binder materials are cellulosic materials such as the esters, e.g. cellulose acetate, cellulose acetate butyrate, and synthetic polymers such as polyurethanes, polyesters, polybutadienes, polyethylenes, polyvinyl acetate and blends and/or copolymers thereof.

Various other minor additives may be added to the formulations of the present invention. Examples of material that may be used include surfactants and antifoam. Preferably, the additives content comprises no more than 10% by weight, desirably less than 5% by weight, of the overall energetic material composition.

For example in propellant and gas generator compositions the additive may for example comprise one or more stabilisers, e.g. carbamite or PNTYIA (para-nitromethylaniline); and/or one or more ballistic modifiers, e.g. carbon black or lead salts; and/or one or more flash suppressants, e.g. one or more sodium or potassium salts, e.g. sodium or potassium sulphate or bicarbonate. Other modifiers particularly for ballistics include iron oxide, catacene or butadiene.

Antioxidant in an extent of up to 1% by weight of the overall composition of the energetic materials may usefully be incorporate in the materials. Phenolic antioxidants such as 2,2'-methylene-bis (4-methyl-6-butyl) phenol has been found to be very suitable.

Bonding agents known per se, e.g. in concentrations of up to 2% by weight of the overall composition weight, may be employed to improve adhesion between the binder and the active energetic components, particularly the oxidiser, although the use of the tackifying resin can reduce or eliminate the need for the bonding agent.

Preferably, where the energetic material according to the present invention is a plastic bonded explosive it contains the following components (in percentage parts by weight): RDX: 80-99.5%, preferably about 88%; binder: 20-0.5%, preferably about 12%; 0 to 1% antioxidant, the overall percentages (excluding further optional additives) adding to 100 in each case.

The formulations of the present invention may be processed into manufactured products by processes which are generally known per se. For example, for the manufacture of plastic bonded explosives the binder ingredients including the tackifier resin may be mixed together in a blender at temperatures of 80° C. to 140° C. and then added to the active component by a solventless process or a solvent lacquer process. Although, in some cases, it may be possible to blend the total formulation all together or in different orders depending on the mixing method used, making a pre-blend of the polymer binder and tackifying resin is the preferred method as polymer binder-tackifying resin compatibility/miscibility is important. The polymer-tackifying resin mixture should ideally be completely compatible/miscible and produce a clear mixture/solution. Although some incompatibility/immiscibility is acceptable providing the mixture is homogeneous throughout the volume with no observable gross phase separation. Where the formulation also contains a cross-linking agent for the polymer binder it is essential that it be added after the polymer has been blended with the tackifier resin and preferably after all the other components have been mixed together. All materials may be mixed simultaneously although this is not preferred. The pre-blend may be prepared in one location and provided to another location for the introduction of the active material and optionally the cross-linking agent for the polymer.

In a solvent lacquer process, the binder tackifier resin mixture may be dissolved in an organic solvent at a moderately elevated temperature, e.g. 40° C. to 80° C. and the active component is subsequently stirred into the solvent lacquer after cooling to about 20° C. to give a slurry. The slurry is then mixed under vacuum at an elevated temperature, e.g. 50° C. to 90° C., preferably 75° C. to 90° C. In a solventless process for example, for the production of plastic bonded nitramines the required quantity of pre-dried active component is wetted with water or an aqueous solution and heated to an elevated temperature, e.g. 80° C.-100° C. The binder tackifier resin mixture is then added to the active component and the components are mixed together at that temperature. Any water remaining in the composition is removed under vacuum.

Materials produced in the ways described above or in other known ways may, depending on the material composition and its intended use, be shaped into products in known ways. For example, the material may be pressed, moulded or cast into a desired shape e.g. for use as blocks, sheet explosive or for filling of shells, warheads and the like. Alternatively, the material may be extruded in a known manner in a corotating twin screw extruder, and subsequently cooled. The latter technique is especially suitable for the manufacture of gun propellant materials, e.g. stick or tubular propellants of known cross-sectional shape.

In summary, the energetic materials of the present invention may, depending upon their specific composition and properties, be used in any one or more of the following well known applications: (i) General demolition; (ii) Explosive welding; (iii) Active armour; (iv) Detonating cord; (v) Linear cutting charges; (vi) Shell fillings; (vii) Mine fillings; (viii) Grenade fillings; (ix) Shaped-charge warhead fillings; (x) rocket propellants and gas generator propellants.

The energetic material needs to be a stable system which can be handled, stored and transported. The conditions under which it should be stable will vary from one energetic material to another and according to the use to which the energetic material is to be put. However generally energetic materials need to be prepared, handled, stored and transported at temperature in the range from −50° C. to 71° C. or higher. We have found that the inclusion of the tackifier resin in the formulation increases the strength of the formulation as shown by stress/strain testing. The presence of the tackifier also increases the elasticity. The formulations are therefore more robust.

Prior to this invention the energetic materials have comprised the active material or materials dispersed within a polymer binder, such as the blend of polyethylene and polyisobutylene of GB 2365240 or other binders as described in https://application.wiley-vch.de/books/sample/3527331557_c01.pdf We have found that the inclusion of a tackifier resin in these formulations improves the adhesion and dispersion of the active material within the polymer binder. This results in better adhesion of the polymeric binder to the other materials, especially the oxidiser, in the formulation and also to the casing or liner. This also results in a more homogeneous distribution of the active material within the polymer binder. This improved dispersion of the active ingredient reduces the energy required for the mixing of the formulation, increases the stability of the material (better mechanical properties, e.g. strength, elongation, etc. prevents damage and debonding on transport and in operation), and help increase density of the formulation.

The invention claimed is:

1. An energetic material formulation comprising:
   i. from 65% to 98% of active material;
   ii. a cross-linking agent;
   iii. from 2% to 20% of a polymeric binder;
   iv. 20 wt. % or less of a plasticiser, based on a weight of the polymeric binder;
   v. from 0.1% to 70% of a tackifier resin compatible with the polymeric binder, based on the weight of the polymeric binder; and
   vi. from 0% to 0.5% of a bonding agent, based on a weight of the active material.

2. The energetic material formulation according to claim 1, wherein the active material comprises a metal fuel, a propellant, a pyrotechnic material, a rocket propellant, an explosive, or a combination thereof.

3. The energetic material formulation according to claim 1, wherein the tackier resin is a rosin ester, a terpenic resin, a C5 hydrocarbon resin, a C9 hydrocarbon resin, a C5/C9 hydrocarbon resin, a DCPD-based resin, a DCPD/C9 hydrocarbon resin, or a combination thereof.

4. The energetic material formulation according to claim 1, wherein the polymer binder is a hydroxy terminated polybutadiene.

5. The energetic material formulation according to claim 1, wherein the use of the tackifier resin reduces or eliminates use of the plasticiser in the energetic material formulation.

* * * * *